July 28, 1931.　　　　R. M. SCHULTZ　　　　1,816,027
DRAFT CONTROLLER
Original Filed Dec. 22, 1928　　3 Sheets-Sheet 1

INVENTOR.
Roy M. Schultz

July 28, 1931.  R. M. SCHULTZ  1,816,027
DRAFT CONTROLLER
Original Filed Dec. 22, 1928   3 Sheets-Sheet 2

INVENTOR.
Roy M. Schultz
BY
ATTORNEYS.

July 28, 1931. R. M. SCHULTZ 1,816,027
DRAFT CONTROLLER
Original Filed Dec. 22, 1928 3 Sheets-Sheet 3

INVENTOR.
Roy M. Schultz.
BY
ATTORNEYS.

Patented July 28, 1931

1,816,027

UNITED STATES PATENT OFFICE

ROY M. SCHULTZ, OF CHICAGO, ILLINOIS, ASSIGNOR TO COOK ELECTRIC COMPANY, OF CHICAGO, ILLINOIS, A CORPORATION OF ILLINOIS

DRAFT CONTROLLER

Application filed December 22, 1928, Serial No. 327,930. Renewed September 22, 1930.

My invention relates to electric draft controllers designed to operate by any form of electrical means and controlled as in the present case by a room thermostat to actuate the air inlet damper and check damper of a heater.

It is desirable to close both the air inlet damper and the check damper during firing of a furnace. Where a controller for these dampers is provided and automatically operated by a room thermostat, according to the room temperature of the building, it is objectionable for obvious reasons to permit temporary disconnection of the dampers at the controller. If the attendant should fail to reconnect the dampers, not only is the operation of the controller rendered ineffective but the fire in the furnace fails to maintain itself. On the other hand, in many cases, the attendant does not have access to the upper floors of the building so as to be able to operate the controller and set the dampers as desired. Accordingly, if he wishes to close the dampers at the controller in the basement, the connections leading to the dampers must be disconnected.

In copending application, Serial No. 314,636, filed October 24, 1928, and assigned to assignee of the present case, a clutch-operated short-circuiting switch is provided for operating the controller in the basement, so that the dampers may be closed and the circuit simultaneously closed to permit the controller thereafter to operate, returning the dampers to non-heating position if the room thermostat should be open. If the room thermostat should happen to be closed and calling for heat in the rooms to be heated, it is quite obvious that disengaging the clutch and closing the short-circuiting switch at the controller in the basement would permanently close this controller circuit and destroy automatic operation. This is due to the fact that in the device disclosed in the aforesaid copending application, opening of the circuit at the controller is dependent upon the room thermostat being open. Consequently, means have been provided in this copending application preventing operation of the clutch-operated short-circuiting switch when the room thermostat is closed.

I find it desirable, however, to permit operation of the clutch-operated short-circuiting switch at all times in the cycle of operation of the control system, so that it is impossible for the attendant to acquire a habit of not closing both dampers because on previous occasions the clutch-operated short-circuiting switch failed to operate.

Other objects and advantages of the invention will be apparent from the following detailed description when taken in connection with the accompanying drawings which form a part hereof.

Figure 1:
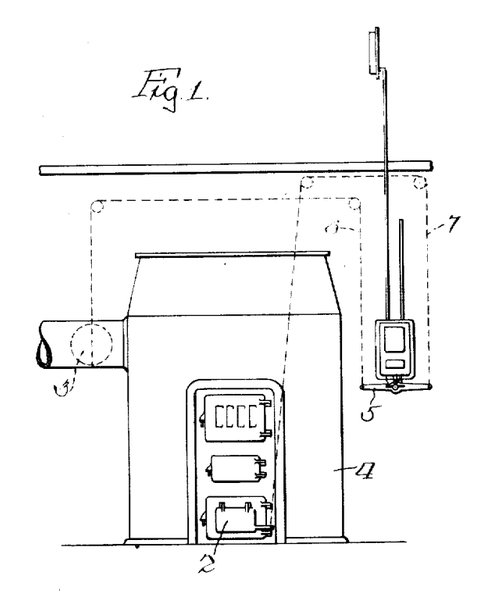
Figure 1 is a view illustrating the front portion of a furnace or heater with the structure embodying my invention applied thereto.

My invention, as embodied in the structure shown in the drawings, comprises an electric draft controller which may be applied to various types of heaters or furnaces having the usual air inlet damper 2 and the check damper 3. In the drawings I have illustrated a furnace, being designated 4, but it will be understood that in so far as the disclosure of my invention is concerned, the illustration is merely conventional, inasmuch as the invention is capable of wide application in this field. The electric draft controller is provided with a damper lever 5, mounted preferably in pivotal relation at the bottom of the controller, and having its ends perforated to permit attachment of suitable connections to the dampers 2 and 3. The left-hand end of damper lever 5 may be connected to check damper 3 by a chain or like flexible connection 6, while the right-hand end of damper lever 5 may be connected to air inlet damper 2 by a chain or like flexible connection 7. The arrangment permits both dampers to be in closed position when damper lever 5 is in horizontal position, as illustrated in Figure 1. Movement of the damper lever clockwise raises the left-hand end to close check damper 3 and lowers the right-hand end to open air inlet damper 2. Counter-clockwise movement of damper lever 5 to the extreme opposite position closes air inlet damper 2 and opens check damper 3.

Figure 2:
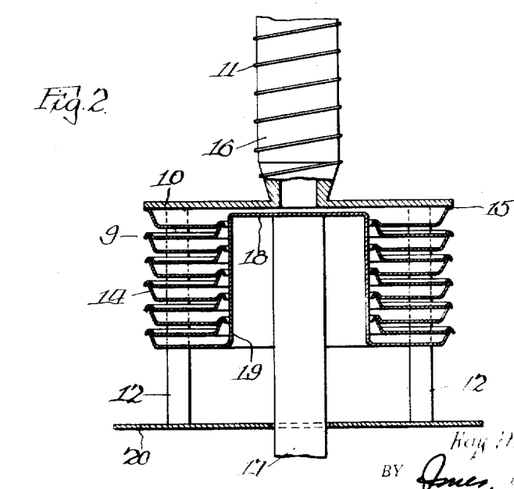
Fig. 2 is an enlarged vertical sectional view of the electrical operating means of the controller.

Any suitable actuating mechanism may be provided in the electric draft controller for operating damper lever 5. It will be understood that while a thermally-operated element 9 of the expansible and contractible type is preferably employed, any suitable electrical mechanism may be used instead in connection with the invention disclosed herein. Thermal element 9 may comprise a rigid plate 10 suitably supported by a plurality of corner posts 12 on base 20 of the housing of the controller. An expansible and contractible wall or bellows 14 is supported at one of its ends by plate 10 and is hermitically sealed to this plate at 15. A tube 16 provided with a heat coil 11 is closed at its top and communicates with the interior of bellows 14. An actuating arm 17 extends through base 20 and into an inverted cup 19 forming a closed interior wall of bellows 14, this actuating arm being operably connected to top plate 18 of cup 19.

Figure 3:
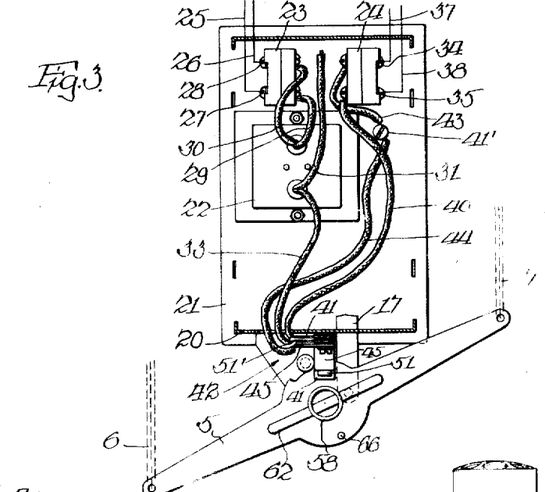
Fig. 3 is a view of the rear wall of the controller illustrating certain circuit connections.
Figure 5:
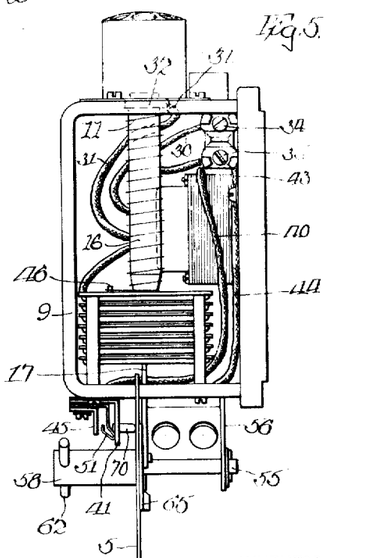
Fig. 5 is a similar view of the opposite side of the controller.
Figure 14:
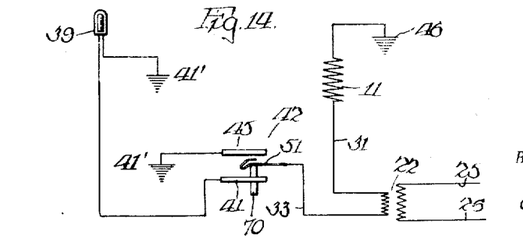
Fig. 14 is a wiring diagram of the controller.

The controller housing includes a vertical wall plate 21 (Fig. 3) carrying any suitable form of transformer 22 and terminal blocks 23 and 24. Terminal block 23 is adapted to receive line wires 25 and 26 at terminals 27 and 28 respectively, which wires are continued at 29 and 30 to transformer 22. Wire 31 leading from the secondary coil or transformer 22 may connect to a terminal band 32 surrounding and suitably attached at the upper end of tube 16. As illustrated in Fig. 5, heat coil 11 will be attached at its upper end to this terminal band 32. Wire 33 of the opposite side of the secondary coil of transformer 22 connects to a relatively movable spring contact 51, this connection being illustrated more clearly at 51' in Fig. 3. Wire 37 connects to the terminal 34 of terminal block 24 and leads to thermostat 39 shown in Fig. 14. This thermostatic circuit is completed by a wire 38 connecting to a terminal 35 of terminal block 24 and then by a wire 40 leading from the opposite side of terminal 35 to a fixed contact 41, which forms part of the clutch-operated short-circuiting switch 42. At the opposite side of terminal block 24, wire 37 is grounded at 41' to wall plate 21 by means of a wire 43, which continues from this ground as wire 44 to a stationary contact 45, also forming part of clutch-operated short-circuiting switch 42. The heating circuit is completed by a ground connection 46 at heat coil 11 to plate 10.

Figure 6:
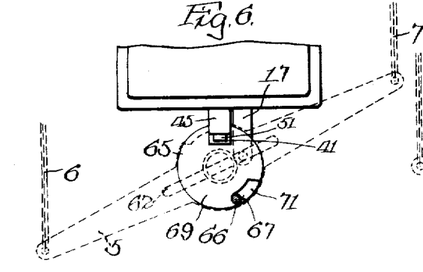
Fig. 6 is a detailed sectional view illustrating the thermostatic short-circuiting switch and the clutch connection between the controller and the damper lever, the damper lever being shown in dotted lines and in non-heating or "off" position.
Figure 7:
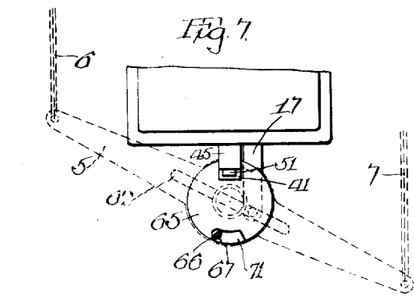
Fig. 7 is a similar view illustrating the damper lever in heating or "on" position.

The closed chamber defined by the interior of bellows 14, as well as the interior of tube 16, is adapted to contain a volatile fluid, which, when heated, will expand the bellows. Such expansion of bellows 14 operates damper lever 5 clockwise, through actuating arm 17, whereby to open air inlet damper 2 and to close check damper 3. This action normally occurs when the heating circuit is closed by the closing of room thermostat 39 upon lowering of the temperature in the room. The normal heating circuit may be traced as follows: from the wire 31 of the secondary coil of transformer 22 to terminal band 32, heat coil 11 to ground 46, continuing from ground 41 through wire 43, terminal 34, wire 37, thermostat 39, wire 38, to terminal 35, through wire 40, to stationary contact 41 and movable contact 51, and returning by wire 33 to the other side of the secondary coil of transformer 22. Current flowing through heat coil 11 develops heat at tube 16 to vaporize and to drive a volatile substance into the closed chamber of thermal element 9 whereby to expand bellows 14 and move actuating arm 17 downwardly. Coil 11 about tube 16 forms or establishes a heating zone and when the volatile substance is driven out of this heating zone into bellows 14, further expansion of bellows 14 is checked. This movement of actuating arm 17 rotates damper lever 5 in a clockwise direction, as shown in Fig. 7, to open air inlet damper 2 and to close check damper 3. Air supplied to heater 4 by way of air inlet damper 2 supports combustion within the heater whereby the room temperature will rise and room thermostat 39 will open. Tube 16 then cools and the vapor condenses to allow the volatile substance to return into tube 16. Bellows 14 will return to normal position and the upward movement of actuating arm 17 will rotate damper lever 5 counterclockwise (see Fig. 6) whereby air inlet damper 2 is closed and check damper 3 is opened.

During the firing of furnace 4, it is desirable to close both dampers and check the draft to prevent the escape of gas and smoke from the coal door. Temporarily disconnecting chains 6 and 7 to accomplish this result should not be permitted because it is possible that the attendant will forget to reconnect these chains. The automatic operation of the dampers by the controller would consequently be destroyed. In the aforesaid copending application, there is disclosed a clutch-operated, short-circuiting switch capable of operation only when the room thermostat is open to allow damper lever 5 to be temporarily disconnected from the controller so as to be moved to a horizontal position to close both dampers and simultaneously to close the heating circuit of the thermal element in order that the controller may thereafter operate, returning the dampers to their "off" position. This clutch-operated short-circuiting switch is so constructed as to prevent its operation when the damper lever 5 is moved to its clockwise or "on" position, with the air inlet damper open and the check damper closed.

Accordingly, the attendant could not move the damper lever to a horizontal position at all times when he desired to fire the furnace, and not having access to the upper levels of the building to open the room thermostat manually, it was necessary for him either to fire the furnace with the air inlet damper open or to disconnect chain 6 from the damper lever in order to close the air inlet door. Another undesirable feature of not permitting the damper lever to be moved to a horizontal position at all times is the possible habit that might be formed by the attendant to overlook operating the damper lever due to its failure to operate on previous occasions when the room thermostat is closed. As the present invention teaches, it is a desirable condition to permit operation of the clutch-operated, short-circulating switch at all times in the operation of the control system. An improved form of short-circuiting switch 42 is therefore provided in the device herein disclosed, this switch permitting the operable clutch connection between the controller and damper lever 5 to be disengaged, irrespective of whether the room thermostat 39 is opened or closed; this switch, however, opening the heating circuit in the event the thermostat is closed and closing the circuit in the event the thermostat is opened. In short, the function of the switch is to control the operation of the mechanism so that the controller will return damper lever 5 to its former position after the dampers 2 and 3 have been permitted to remain closed a sufficient length of time after the firing of the furnace.

As previously mentioned, short-circuiting switch 42 comprises stationary contacts 41 and 45 and the movable contact 51 adapted to engage the stationary contacts. Movable contact 51 perferably has three positions. By referring to Fig. 14, it will be noted that when movable contact 51 is in its normal position of engagement with stationary contact 41, the circuit is completed from the secondary coil of transformer 22 through this movable contact 51, stationary contact 41, thermostat 39, ground 41', ground 46, through the heat coil to the opposite side of the secondary coil of transformer 22. This condition exists during the normal automatic operation of the control.

In the event it is desired to move damper lever 5 to a horizontal position while contact 51 is in engagement with stationary contact 41 and the thermostat 39 is closed, current flowing, of course, through heat coil 11 and heat being generated to operate thermal element 9, whereby to hold damper lever 5 in the position shown in Fig. 7, damper lever 5 is pulled forwardly and rotated, as will be presently described, contact 51 being disengaged from contact 41 as the damper lever is pulled forwardly. The circuit is broken, and consequently, heat coil 11 cools. The result is that the movable contact is returned, by the contraction of thermal element 9, into engagement with contact 41 to allow the normal automatic condition of the control to continue.

In the event it is desired to move damper lever 5 to a horizontal position when thermostat 39 is opened and the current is not flowing through heat coil 11, damper lever 5 is pulled forwardly and rotated, thereby bringing movable contact 51 into engagement with stationary contact 45. Current then flows from the secondary of transformer 22, through movable contact 51, stationary contact 45, ground 41', ground 46, heat coil 11, to the opposite side of the secondary coil of this transformer. The heat developed at coil 11 will operate thermal element 9 to move damper lever 5 clockwise until the clutch connection is again established, whereupon, as will be later explained, the circuit is broken by movable contact 51 disengaging contact 45.

Figures 4, 15:
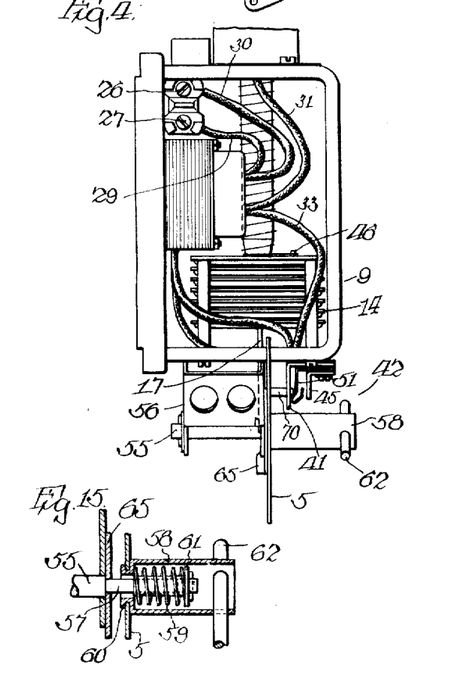
Fig. 4 is an elevation of one side of the controller.
Fig. 15 is a vertical sectional view of the handle of the damper lever.
Figure 13:
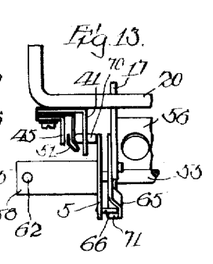
Fig. 13 is also a similar view of this mechanism when the damper lever is in its "off" position, as shown in Fig. 9.

Damper lever 5 is preferably carried in pivotal relation on a shaft 55 suitably carried in depending arms of a bracket 56 suspended from the underside of base 20 of the controller house. Referring to Fig. 15, shaft 55 is reduced at 57 and projects forwardly into a sleeve 58 forming a housing for a coil spring 59 carried on this shaft. Damper lever 5 is provided with an aperture 60 into which the inner end of sleeve 58 is suitably secured, the sleeve at this end forming an abutment for the inner end of spring 59. A collar 61 is suitably carried on the outer end of the reduced end 57 of shaft 55 to form an abutment for the outer end of spring 59. A pin serving as a handle 62 passes through sleeve 58 in a manner permitting the same to be easily gripped whereby to pull damper lever 5 forwardly and disengage it from operating lever 17 of thermal element 9. Rotatably carried on reduced end 57 of shaft 55 is a disc 65 pivotally connected to actuating arm 17. The central portion of damper lever 5 is formed circular and is adapted normally to lie flat against disc 65. Clutch pin 66 is fixed to damper lever 5 and normally engages in a hole 67 in disc 65, as will be noted in Figs. 6 and 10. Consequently, the rotational movement of disc 65 caused by movement of actuating arm 17 is imparted to damper lever 5, so that normally damper lever 5 will move clockwise to the position shown in Fig. 7 when thermal element 9 expands, and counterclockwise to the position shown in Fig. 6 when thermal element 9 contracts. Disc 65 is furnished with a depressed groove 71, which is arcuate in form and in which hole 67 is provided in disc 65. When clutch pin 66 engages in hole 67, damper lever 5 lies flatly against disc 65. When the tip of pin 66 rides in groove 67, damper lever 5 is extended outwardly a distance to move movable contact 51 in an intermediate position, that is to say, in a position disengaging both stationary contacts 41 and 45. This position of movable contact 51 is illustrated in Fig. 13. When the tip of pin 66 rides on the outer face 69 of disc 65, damper lever 5 is pulled still farther forwardly whereby movable contact 51 engages stationary contact 45. Movement of movable contact 51 is obtained by means of a slidable plunger 70 arranged to operate in an opening provided in stationary contact 41, as illustrated in Figs. 10 to 13, inclusive, and actuated by the movement of damper lever 5.

From the above description, it will be observed that the position of movable contact 51 with respect to the stationary contacts 41 and 45 will depend upon the extent to which damper lever 5 is pulled forwardly by handle 62. The extent to which damper lever 5 will be pulled forwardly depends upon whether room thermostat 39 is opened or closed.

Assume now that the thermostat is closed and calls for heat at the furnace. Current flows through heat coil 11 and causes thermal element 9 to actuate whereby to depress actuating arm 17 and rotate disc 65 clockwise. Damper lever 5 will also be rotated clockwise to the position shown in Fig. 7, whereupon air inlet damper 2 will be opened and check damper 3 will be closed. When the room temperature reaches the predetermined setting on thermostat 39, the latter opens and discontinues the flow of current through heat coil 11. Thermal element 9 will then contract or actuate in the opposite direction to raise actuating arm 17 and to rotate disc 65 counterclockwise. Counterclockwise movement of disc 65 returns damper lever 5 to the position shown in Fig. 6.

Figure 8:
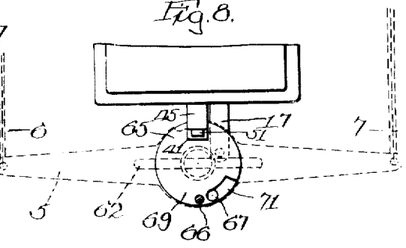
Fig. 8 is a similar view illustrating the clutch connection disengaged, the thermostat short-circuiting switch closed and the damper lever manually moved from its "off" position (when the room thermostat is open) to horizontal position to close both dampers.
Figure 10:
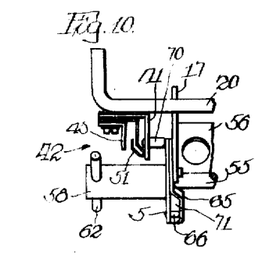
Fig. 10 is a side elevational view of the thermostatic short-circuiting switch and the clutch connection when the damper lever is in its "off" position, as shown in Fig. 6.
Figure 11:
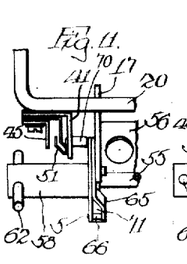
Fig. 11 is a similar view when the damper lever is in its "on" position, as sown in Fig. 7.
Figure 12:
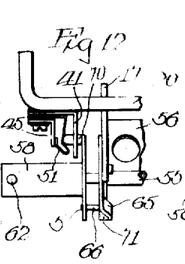
Fig. 12 is a similar view of this mechanism when the damper lever is in its horizontal position, as shown in Fig. 8.

Assume now that with the thermostat in open position and with air inlet damper 2 closed and check damper 3 open, the attendant desires to fire furnace 4. Handle 62 is gripped and pulled forwardly to disengage damper lever 5 from disc 65 and turned to a horizontal position, as shown in Fig. 8, whereby clutch pin 66 will, moving to the left, ride face 69 of disc 65. This requires that damper lever 5 be moved its farthermost position outwardly whereby plunger 70 will engage and move movable contact 51 into engagement with stationary contact 45, which is grounded by means of wire 44 at 41'. The heating circuit of coil 11 is then closed and the current will flow from the secondary coil of transformer 22 through wire 33, movable contact 51, stationary contact 45, through ground connections 41' and 46, heat coil 11, and to the opposite side of the secondary coil by means of wire 31. Heat developed at heat coil 11 will actuate thermal element 9 and cause actuating arm 17 to be depressed whereby to rotate disc 65 clockwise in the same manner as above described. This clockwise rotation of disc 65 brings hole 67 into alignment with clutch pin 66, whereby the coil spring 59 in handle 58 causes this clutch pin to engage in hole 67 and return damper lever 5 inwardly to its normal position against disc 65. This reengagement of damper lever 5 with disc 65 releases contact 51 from engagement with contact 45 whereby the circuit is broken and the current discontinues flowing through heat coil 11. Contact 51 will thereby engage contact 41 as illustrated in Fig. 10. The circuit is, however, broken by virtue of the fact that the thermostat 39 is open. Damper lever 5 will return to the position shown in Fig. 6 and air inlet damper 2 will again be closed and the check damper 3 will be again open.

Figure 9:
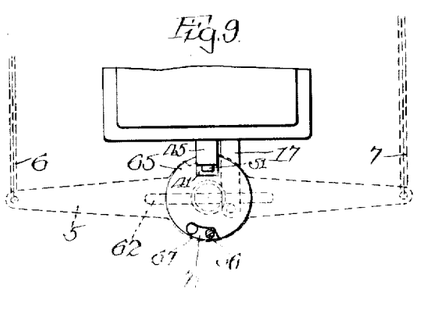
Fig. 9 is a similar view illustrating the clutch connection disengaged, the thermostat short-circuiting switch open, and the damper lever moved from its "on" position (when the room thermostat is closed) to a horizontal position to close both dampers.

Assume now that the attendant desires to fire the boiler while room thermostat 39 is closed and the damper lever 5 is in the position shown in Fig. 7. In the aforesaid copending application, means is provided to prevent moving damper lever 5 to a horizontal position at this time, due to the fact that the structure disclosed in this copending application would cause the heating circuit at coil 11 to be permanently closed. In the present case, however, groove 71 permits clutch pin 66 to be pulled outwardly a distance sufficient to allow the clutch pin to ride in this groove 71. Damper lever 5 may then be moved to a horizontal position, as shown in Fig. 9, with this clutch pin in groove 71. By pulling damper lever 5 outwardly so that its clutch pin 66 will ride in groove 71, it has not been pulled outwardly the entire length of its outward movement but only to cause movable contact 51 to move to its intermediate position by means of plunger 70 whereby temporarily to break the circuit. Thermal element 9 will then cool and rotate disc 65 counterclockwise a distance sufficient to bring hole 67 into engagement with clutch pin 66. Damper lever 5 will then be permitted to move inwardly against disc 65 with clutch pin 66 in engagement with hole 67 in this disc. This movement of damper lever 5 inwardly again brings movable contact 51 into engagement with contact 41, thereby closing the circuit because this time room thermostat 39 is closed. Heat will again develop at heat coil 11 to actuate thermal element 9 and again to rotate damper lever 5 clockwise to the position shown in Fig. 7 until room thermostat is again opened.

It will be accordingly observed that a structure is provided herein in connection with an electric draft controller permitting damper lever 5 to be moved to a horizontal position, whereby to close both dampers irrespective of the position of room thermostat 39. If room thermostat 39 is closed, short-circuiting switch 42 functions to open the circuit temporarily while damper lever 5 is in a horizontal position and the dampers are closed, but opening the circuit at this time will cause the thermal element to contract and to again engage the clutch connection between damper lever 5 and the controller whereby to again close the circuit and allow the thermal element to return the damper lever to its clockwise position. On the other hand if room thermostat 39 is open, short-circuiting switch 42 closes the circuit to cause thermal element 9 to actuate, so that after the furnace has been fired, damper lever 5 will be returned from its horizontal position to its "off" position and the heating circuit again open.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. An electric control for operating the air inlet damper and the check damper of a heater comprising, in combination, an electric circuit including an electrically operated controller for actuating the air inlet damper and the check damper, a thermostat in said circuit for controlling said electrically operated controller, and means at said controller for disconnecting said dampers from said controller for independent operation and for simultaneously opening or closing said circuit.

2. An electric control for operating the air inlet damper and the check damper of a heater comprising, in combination, an electric circuit including an electrically operated controller for actuating the air inlet damper and the check damper, a thermostat in said circuit for controlling said electrically operated controller, and a manually operable switch for opening or closing said circuit independently of said thermostat, said dampers operating independently of said controller when said switch operates.

3. An electric control for operating the air inlet damper and the check damper of a heater comprising, in combination, an electric circuit including an electrically operated controller for actuating the air inlet damper and the check damper, a thermostat for closing said circuit and operating said controller to open said air inlet damper and to close said check damper, a clutch connection between said dampers and said controller whereby said dampers may be disconnected from said controller and operated independently, and a switch in said circuit adapted to open the circuit when said dampers are disconnected from said controller.

4. An electric control for operating the air inlet damper and the check damper of a heater comprising, in combination, an electric circuit including a thermostat and an electrically operating controller for causing predetermined movement of said dampers when the circuit is closed by said thermostat, means for thereafter moving said dampers independently of said controller, and a switch for opening the circuit when said dampers are moved by said means whereby said controller will operate in a reverse direction, to again engage said dampers and to close said circuit at said switch.

5. An electric control for operating the air inlet damper and the check damper of a heater comprising, in combination, an electric circuit including a thermostat and an electrically operated controller for opening said air inlet damper and for closing said check damper when the circuit is closed by said thermostat, a clutch connection between said dampers and said controller whereby said dampers may be disconnected and closed during the firing of said heater, and means for opening the circuit when said dampers are closed.

6. An electric control for operating the dampers of a heater comprising, in combination, an electric circuit including a room thermostat and an electric controller for the dampers, and means at said controller operable to open the circuit temporarily while closed by said thermostat and to move said dampers to firing position during firing of said heater.

7. An electric control for operating the dampers of a heater comprising, in combination, an electric circuit including a thermostat and an electric controller for said dampers, and means operable to move said dampers to firing position while said heater is fired, said means either opening or closing the circuit whereby said controller may thereafter move to return said dampers to their former position.

8. An electric control comprising, in combination, a plurality of dampers, an electric circuit including an electrically operated controller for actuating said dampers, a thermostat to close said circuit and operate said controller, a connection between said dampers and said controller for moving one of said dampers to open position and the other damper to closed position when said circuit is closed, and a switch associated with said connection whereby said circuit may be temporarily opened at the controller and both of said dampers moved to closed position independently of said controller.

9. An electric control comprising, in combination, a plurality of dampers, an electric circuit including an electrically operated controller for actuating said dampers, a thermostat in said circuit for controlling said electrically operated controller, an operative connection between said dampers and said controller for causing a predetermined movement of said dampers when said controller operates, a switch associated with said operative connection, and means for breaking said operative connection and operating said switch whereby said dampers may be manually operated and thereafter automatically returned by said controller to their former position regardless of whether said controller is under the control of said thermostat.

10. The combination with a heater, of an electric circuit including a thermostat and an electrically operative controller, a damper lever actuated by said electrically operated controller, a clutch connection between said damper lever and said controller permitting said damper lever to be disengaged from said controller, and a normally closed switch operable by the disengagement of said damper lever to open the circuit while said thermostat is closed and to close the circuit while said thermostat is open.

11. The combination with a heater, of an electric circuit including a thermostat and an electrically operated controller, a damper lever actuated by said electrically operated controller, a switch in circuit with said controller and controlled by said damper lever, and means for disconnecting said damper lever from said controller and operating said switch, said switch having provisions for opening the circuit when said thermostat is closed and a short circuiting contact to close said circuit when said thermostat is open whereby to reconnect said damper lever and said controller after a predetermined interval of time.

12. Means for operating a control member comprising, in combination, an electric circuit including a thermostat and an electrically operated controller for actuating said control member when the circuit is closed by said thermostat, a clutch connection between said controller and said control member whereby said control member may be disconnected and manually actuated, and means for opening the circuit when said control member is manually actuated.

13. In combination, a thermostat responsive to temperature variations, a motor, the operation of which is controlled by said thermostat, a control member arranged for actuation by said motor, a clutch connection between said motor and said control member whereby said control member may be disconnected and independently actuated, and means for operating said motor or discontinuing its operation, as the case may be, when said control member is disconnected and independently actuated.

14. In combination, a thermostat responsive to temperature variations, a motor, the operation of which is controlled by said thermostat, a control member arranged for actuation by said motor, a connection between said motor and said control member whereby said control member may be disconnected and independently actuated, and means for stopping said motor, if operating, when said control member is disconnected and independently actuated.

15. In combination in an automatic damper control, a damper actuating device mounted for automatic movement into two positions, means for moving said damper actuating device from either of said two positions into a third position independently of its automatic control, and automatic means for restoring said damper actuating device to its automatic control after a predetermined period.

16. In combination, a thermostat responsive to temperature variations, a motor, the operation of which is controlled by said thermostat, a damper actuating member operated by said motor in response to said thermostat, means for laterally displacing said damper actuating member to disconnect it from said motor and to provide an independent movement whereby it may be moved to a selected position, said damper actuating member having two positions of lateral displacement, and a switch for controlling said motor arranged to be closed when said damper actuating member is in one of its positions of lateral displacement, and to be opened when said damper actuating member is in the other of its positions of lateral displacement.

17. In combination, an electrically operated motor, a damper actuating member operated by said motor, means to disconnect said damper actuating member from said motor for independent movement, said damper actuating member being movable into one of several positions when disconnected from said member, and a switch adapted to be closed to operate said motor and to reconnect therewith said damper actuating member when it is moved into one of said several positions.

18. In combination, a thermostat responsive to temperature variations, a motor, the operation of which is controlled by said thermostat, a damper actuating member operated by said motor in response to said thermostat, means to disconnect said damper actuating member from said motor and to place it in one of a plurality of positions independent of the positions into which it is moved by operation of said motor, and means to operate said motor independently of said thermostat when said damper actuating member is moved into one of said plurality of positions.

19. In combination in an automatic damper control, lever mechanism mounted for automatic movement into two positions, means for disconnecting said lever mechanism from its automatic con rol, while in either of said two positions, for independent movement, and automatic means for restoring said lever mechanism to its automatic control after a predetermined period.

20. In combination in an automatic damper control, lever mechanism mounted for automatic movement into two positions, and manually operable clutch engaging means for disconnecting said lever mechanism from its automatic control, while in either of said two positions, for independent movement, and automatic means for restoring said lever mechanism to its automatic control after a predetermined period.

21. In combination in an automatic damper control, lever mechanism mounted for automatic movement either into on or off positions, and manually operable means for temporarily disconnecting said lever mechanism from its automatic control, while in either its on or off positions, for movement into a third position, and automatic means for restoring said lever mechanism to its automatic control after a predetermined period.

22. An electric control for operating the air inlet damper and the check damper of a heater comprising, in combination, an electric circuit including an electrically operated controller for actuating the air inlet damper and the check damper, a thermostat in said circuit for controlling said electrically operated controller, and manually operable circuit controlling means for opening said circuit independently of said thermostat, said dampers operating independently of said controller when said circuit controlling means operates.

23. An electric control for operating a damper or the like of a heater comprising, in combination, an electric circuit including an electrically operated controller for actuating said damper, a thermostat for closing said circuit and operating said controller to operate said damper, a clutch connection between said damper and said controller whereby said damper may be disconnected from said controller and operated independently, and a switch in said circuit adapted to open the circuit when said damper is disconnected from said controller and operated independently.

24. In combination, a heat motor and resistance heating means therefor, a thermostat responsive to temperature variations, in circuit with said resistance heating means and adapted normally to control said resistance heating means, damper actuating means between said motor and of a furnace adapted to be operated by said motor in response to said thermostat, manually operable means for discontinuing the operation of said motor over said damper actuating means whereby to move the damper independently of the operation of said motor, and means to open the circuit through said resistance heating means when the damper is moved independently of said motor.

25. In combination, a thermostat responsive to temperature variations, a motor, the operation of which is controled by said thermostat, an actuating connection between said motor and the damper or the like of a furnace adapted to be operated in response to said thermostat, means for breaking said actuating connection, and means independent of said thermostat adapted to open the circuit of said motor in response to the breaking of said actuating connection.

26. In combination with a motor, a work performing connection therefor adapted to be actuated by said motor in opposite directions, a rotary member operatively associated with said work performing connection, an actuating member associated with said member, a clutch connection adapted normally to maintain said actuating member in driving relation with said member, said clutch connection including a clutch pin on said actuating member and a cooperating clutch opening in said member to receive said clutch pin, and a circuit breaker in the circuit of said motor, said circuit breaker opening said motor circuit when said clutch connection is broken.

In witness whereof, I have hereunto subscribed my name.

ROY M. SCHULTZ.

connection including a clutch pin on said actuating member and a cooperating clutch opening in said member to receive said clutch pin, and a circuit breaker in the circuit of said motor, said circuit breaker opening said motor circuit when said clutch connection is broken.

In witness whereof, I have hereunto subscribed my name.

ROY M. SCHULTZ.

CERTIFICATE OF CORRECTION.

Patent No. 1,816,027.   Granted July 28, 1931, to

ROY M. SCHULTZ.

It is hereby certified that error appears in the printed specification of the above numbered patent requiring correction as follows: Page 2, line 4, for the misspelled word "smilar" read similar; line 5, for "sown" read shown; line 17, for "compirses" read comprises, and line 61, for "hermitically" read hermetically; page 7, line 101, claim 24, after the word "and" insert the words a damper or the like, and line 113, claim 25, for the misspelled word "controled" read controlled; and that the said Letters Patent should be read with these corrections therein that the same may conform to the record of the case in the Patent Office.

Signed and sealed this 27th day of October, A. D. 1931.

M. J. Moore,
Acting Commissioner of Patents.

(Seal)

CERTIFICATE OF CORRECTION.

Patent No. 1,816,027.             Granted July 28, 1931, to

ROY M. SCHULTZ.

It is hereby certified that error appears in the printed specification of the above numbered patent requiring correction as follows: Page 2, line 4, for the misspelled word "smilar" read similar; line 5, for "sown" read shown; line 17, for "compirses" read comprises, and line 61, for "hermitically" read hermetically; page 7, line 101, claim 24, after the word "and" insert the words a damper or the like, and line 113, claim 25, for the misspelled word "controled" read controlled; and that the said Letters Patent should be read with these corrections therein that the same may conform to the record of the case in the Patent Office.

Signed and sealed this 27th day of October, A. D. 1931.

(Seal)

M. J. Moore,
Acting Commissioner of Patents.